United States Patent
Dai et al.

(10) Patent No.: US 12,392,717 B2
(45) Date of Patent: Aug. 19, 2025

(54) PLASMON ENHANCED INFRARED SENSOR FOR DETECTING PROTEIN FINGERPRINTS IN AQUEOUS SOLUTION AND PREPARATION METHOD OF PLASMON ENHANCED INFRARED SENSOR

(71) Applicant: NATIONAL CENTER FOR NANOSCIENCE AND TECHNOLOGY, Beijing (CN)

(72) Inventors: Qing Dai, Beijing (CN); Chenchen Wu, Beijing (CN); Xiaoxia Yang, Beijing (CN); Xiangdong Guo, Beijing (CN)

(73) Assignee: NATIONAL CENTER FOR NANOSCIENCE AND TECHNOLOGY, Beijing (CN)

( * ) Notice: Subject to any disclaimer, the term of this patent is extended or adjusted under 35 U.S.C. 154(b) by 0 days.

(21) Appl. No.: 18/277,094

(22) PCT Filed: Jul. 5, 2022

(86) PCT No.: PCT/CN2022/103846
§ 371 (c)(1),
(2) Date: Aug. 14, 2023

(87) PCT Pub. No.: WO2023/151225
PCT Pub. Date: Aug. 17, 2023

(65) Prior Publication Data
US 2025/0012717 A1    Jan. 9, 2025

(30) Foreign Application Priority Data
Feb. 10, 2022    (CN) .......................... 202210125133.6

(51) Int. Cl.
*G01N 21/3577*    (2014.01)
*G01N 21/85*    (2006.01)

(52) U.S. Cl.
CPC .......... *G01N 21/3577* (2013.01); *G01N 21/85* (2013.01)

(58) Field of Classification Search
CPC ........................... G01N 21/3577; G01N 21/85
See application file for complete search history.

(56) References Cited

U.S. PATENT DOCUMENTS 12,332,151 B2 *    6/2025    Berndt ............... G01N 15/1436
2017/0352492 A1    12/2017    Tang et al.

FOREIGN PATENT DOCUMENTS

CN    108389930 A    8/2018
CN    108593590 A    9/2018
(Continued)

*Primary Examiner* — David P Porta
*Assistant Examiner* — Fani Polyzos Boosalis
(74) *Attorney, Agent, or Firm* — Bayramoglu Law Offices LLC

(57) ABSTRACT

The invention provides a plasmon enhanced infrared spectrum sensor for detecting a protein secondary structure in an aqueous solution and a preparation method of the plasmon enhanced infrared spectrum sensor, and belongs to the technical field of infrared optical sensing. The sensor includes a graphene plasmon chip and a micro-fluidic system compatible with infrared transmission testing. Under excitation of incident infrared light, a locally enhanced electromagnetic field (surface plasmon) is formed on the surface of the graphene layer due to collective oscillation of charges, and molecules to be detected in an aqueous solution are enriched in a surface plasmon region due to Van der Waals interaction of the graphene layer. The infrared response of to-be-detected molecules gathered in the plasmon region is enhanced under the driving of an electromagnetic field of graphene plasmon; meanwhile, water molecules are excluded out of a plasmon region, molecular signals out of the plasmon region can be completely eliminated by using an in-situ electrical background deduction (Continued)

method, and direct and in-situ monitoring of trace solution components by infrared spectroscopy is realized.

20 Claims, 7 Drawing Sheets

(56) References Cited

FOREIGN PATENT DOCUMENTS

| | | |
|---|---|---|
| CN | 113533300 A | 10/2021 |
| CN | 114486802 A | 5/2022 |

* cited by examiner

PLASMON ENHANCED INFRARED SENSOR FOR DETECTING PROTEIN FINGERPRINTS IN AQUEOUS SOLUTION AND PREPARATION METHOD OF PLASMON ENHANCED INFRARED SENSOR

CROSS REFERENCE TO THE RELATED APPLICATIONS

This application is the national phase entry of International Application No. PCT/CN2022/103846, filed on Jul. 5, 2022, which is based upon and claims priority to Chinese Patent Application No. 202210125133.6, filed on Feb. 10, 2022, the entire contents of which are incorporated herein by reference.

TECHNICAL FIELD

The present invention relates to the technical field of optical infrared sensing, and in particular, to a plasmon enhanced infrared sensor for detecting protein fingerprints in an aqueous solution and a method for preparing the same.

BACKGROUND

The infrared absorption spectrum can rapidly and non-destructively realize quantitative analysis and structural identification of materials by analyzing characteristic infrared absorption caused by the inherent vibration mode of molecules and further identifying chemical bonds and functional groups in the molecules, and is widely applied to the fields of chemical composition analysis, environmental monitoring, food safety tests, explosive detection, biomedicine and the like.

Aqueous solutions are environments where many biochemical molecules remain active, and in-situ monitoring of chemical components and structural changes of molecules to be detected in a solution by infrared analysis is an important means for investigating biochemical processes. However, as water molecules have very strong infrared absorption, which overrides most of the information of solute molecules, the existing infrared spectroscopic techniques that can analyze an aqueous solution, including ATR and transmission liquid cell, involve complex background signal subtractions and have high demand on the sample amount or concentration. In addition, since the wavelength of mid-infrared light (10 µm magnitude) is 3 orders of magnitude greater than the size of common molecules (less than 10 nm), the interaction between infrared light and trace molecules to be detected in an aqueous solution may be very weak, and thus the infrared spectroscopy may not be directly used for detecting trace substances in aqueous solutions.

Graphene plasmons can compress the wavelength of infrared light by more than 100 folds, and carriers in graphene hold the characteristic of massless Dirac fermions. Therefore, the plasmons have the advantages of high local enhancement capacity in an electric field, dynamic adjustability, low intrinsic damping and the like in a mid-infrared band, and can effectively enhance the infrared response of molecules, thus having important application value in the field of infrared spectroscopy enhancement. In a solution environment, graphene can localize 80% infrared light energy within a surface area of about 15 nm, such that background signal interference from water in the solution is reduced. As such, graphene is of great significance for infrared detection of nanoscale molecules in solution environments.

However, graphene plasmons have not been used for real-time in-situ detection of a liquid sample. Challenges lie in that no suitable sensor is available for combining a micro-fluidic system compatible with infrared transmission/reflection measurement and a graphene plasmon infrared sensor, and conventional materials for preparing micro-fluidic systems such as quartz and PDMS have strong infrared absorption. The lack of a direct elimination method of the water background signals in a solution is also a problem.

SUMMARY

The present invention is intended to provide a plasmon enhanced infrared sensor for detecting protein fingerprints in an aqueous solution directly.

In order to achieve the above objective, the present invention provides the following technical solutions:

The present invention provides a plasmon enhanced infrared sensor for detecting protein fingerprints in an aqueous solution, including a graphene plasmon infrared sensor and a micro-fluidic system compatible with infrared transmission/reflection measurement;

where the graphene plasmon infrared sensor includes a substrate, a source and a drain, an electrode passivation layer, a graphene layer, a graphene modification layer, a liquid top-gate, a liquid micro-nano cavity and an infrared transparent window;

the micro-fluidic system compatible with infrared transmission/reflection measurement is provided with a sample inlet channel and a sample outlet channel communicated with the graphene plasmon infrared sensor.

Furthermore, the liquid top-gate is conditioned through a reference electrode;

the graphene layer is a periodic nanostructure including a plurality of structures with a combined step-shaped longitudinal sectional profile; the liquid micro-nano cavity is arranged above the graphene plasmon infrared sensor through a spacer and an infrared transparent window.

Furthermore, the periodic nanostructure of the graphene layer includes a graphene micro/nanostructure and an etched graphene region; the graphene micro/nanostructure includes any one of a square, an ellipse and a triangle.

Furthermore, the graphene micro/nanostructure and the etched graphene region independently have a dimension of 5-1000 nm in any direction.

Furthermore, the graphene layer surface is covered with a graphene modification layer, and the graphene modification layer and graphene are connected through hydrophobicity, a covalent bond or an ionic bond;

the material of the graphene modification layer includes any one of hBN, $MoS_2$, $MoSe_2$, $WS_2$, $WSe_2$, $SiO_2$, $Al_2O_3$, Au, Ag, Cu, Pd, graphene oxide, CuCo alloy, CuPd alloy, benzoic acid, phenylacetic acid, thiol and a macromolecular polymer; the macromolecular polymer includes one or more of polystyrene, polymethylmethacrylate, polyacetic acid, polyethylene, polypropylene, sDNA, DNA, RNA, antibody, antigen, enzyme and thiol.

Furthermore, the electrode passivation layer covers the source and the drain, and the material of the electrode passivation layer is an insulating material including any one of polyethylene, polyether ether ketone, silica gel, resin, ethyl acrylate, asphalt, polyethyl acetate, polyvinyl alcohol, cinnamate, polymethylmethacrylate, polyvinyl alcohol cinnamate and rubber, and the insulating material has a thickness of 0.01-10 μm.

Furthermore, the materials of the infrared transparent window and the substrate are independently materials transparent to infrared light with dielectric performance, including one of $SiO_2$, SiN, $Si_3N_4$, $MgF_2$, $Al_2O_3$, $CaF_2$, $BaF_2$, $HfO_2$, $Y_2O_3$, Ge, Si, LiF, AgBr, AgCl, ZnS, ZnSe, KRS-5, AMTIR1-6, diamond, diamond-like carbon and graphene; the infrared transparent window has a thickness of 10 nm-10 mm.

Furthermore, the liquid micro-nano cavity is formed by preparing a groove below the infrared transparent window, depositing a patterned thin film on a graphene device to prepare a passivation layer, or placing a spacer between the infrared transparent window and the graphene chip to form a microcavity channel.

Furthermore, the material of the spacer includes one or more of nanosheet, $SiO_2$, SiN, $Si_3N_4$, $MgF_2$, $Al_2O_3$, $CaF_2$, $BaF_2$, $HfO_2$, $Y_2O_3$, Ge, Si, LiF, AgBr, AgCl, ZnS, ZnSe, KRS-5, AMTIR1-6, Au, Pt, Pd, Cu, CuO, Ag, PdO, $PdO_2$, Al, Fe, polytetrafluoroethylene, lead, Mylar, CuCo alloy and CuPd alloy; the material of the patterned thin film deposited on the graphene device includes one or more of Au, Cr, Ti, $MgF_2$, $Al_2O_3$, $SiO_2$, $MgF_2$, $CaF_2$, $BaF_2$, $HfO_2$, $Y_2O_3$, LiF, AgBr, AgCl, ZnS and ZnSe, and preferably one or more of LiF, AgBr, AgCl, ZnS and ZnSe; the patterned thin film has a thickness of 0.001-5 μm.

The present invention provides a method for preparing the plasmon enhanced infrared sensor for detecting the protein fingerprints in the aqueous solution, including:
  depositing a source and a drain to a substrate, transferring a graphene layer, and preparing a graphene micro-nano structure and a graphene modification layer on the graphene layer;
  preparing an electrode passivation layer and a liquid micro-nano cavity;
  and preparing an infrared transparent window, and sealing the graphene plasmon infrared sensor, the liquid micro-nano cavity and a transmission infrared liquid flow cell by using O rings to obtain the sensor.

The advantages of the present invention are as follows:

The graphene layer of the present invention has a localized electromagnetic field enhancement region with nanometer-scale dimensions above the graphene layer, which can eliminate the interference from water background signals and enhance the infrared absorption of molecules within the plasmon region. The chemical composition and structures of molecules are identified through the infrared characteristic absorption peak on the obtained enhanced infrared spectroscopy. The wavelength of plasmons is in the mid-infrared band (the resonant frequency is 400-3000 wave numbers), and the sensor can be dynamically modulated, repeatedly used and integrated.

BRIEF DESCRIPTION OF THE DRAWINGS

FIGS. 8A-8C show three representative microstructures: a rectangle, a square and an ellipse; FIGS. 8D-8F show the corresponding inverse structures; where the shape of the microstructure is not limited to the three and may be other regular or irregular shapes, and the dimension of the microstructure in one direction is within a range of 10-200 nm.

Step 901: select a supporting substrate made of an infrared-transparent and firm material with a smooth surface, and prepare a dielectric layer on the substrate;

Step 902: prepare a graphene micro-nano structure and electrodes on the supporting substrate;

Step 903: prepare a graphene modification layer and an electrode passivation layer on surfaces of the graphene micro-nano structure and the electrodes;

Step 904: prepare a liquid microcavity on a surface of a graphene plasmon device;

Step 905: prepare a cover plate with a sample inlet channel and a sample outlet channel;

Step 906: encapsulate the cover plate and the graphene device to obtain the graphene plasmon infrared sensor working on an aqueous solution; and Step 907: test the liquid flow performance and the infrared spectroscopy enhancement performance of the device.

Figure 10:
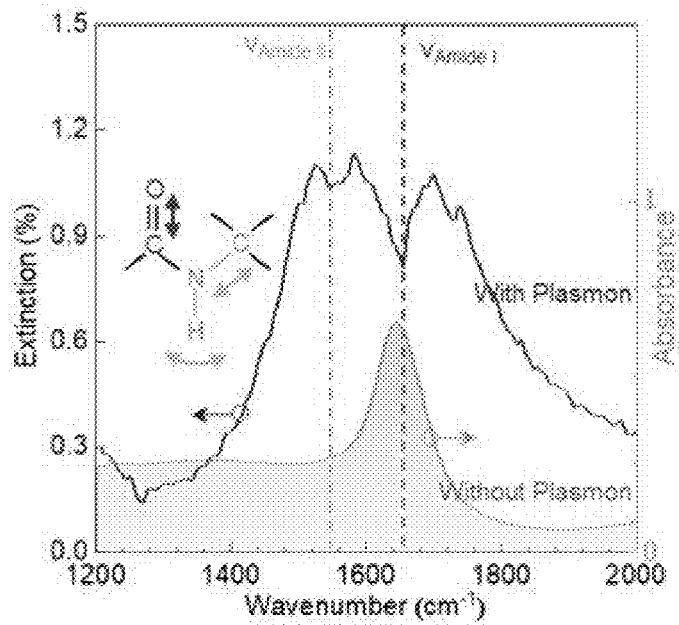

FIG. 10 illustrates an exemplary infrared absorption spectrum of an aqueous protein solution measured without plasmon enhancement and an exemplary extinction spectrum measured with plasmon enhancement after a protein solution is introduced into the graphene plasmon infrared sensor according to Example 1, and the characteristic vibration modes of proteins at the amide I band and the amide II band can be identified.

Figure 11:
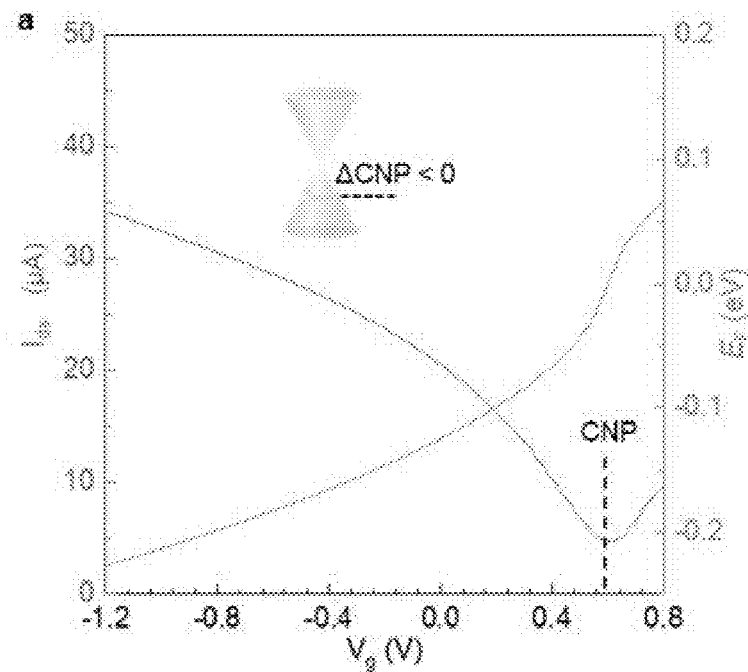

FIG. 11 illustrates the transfer characteristic curve of the graphene plasmon infrared sensor according to Example 1 in an aqueous solution and the Fermi energy of graphene corresponding to gate voltage applied to the graphene layer.

Figure 12:
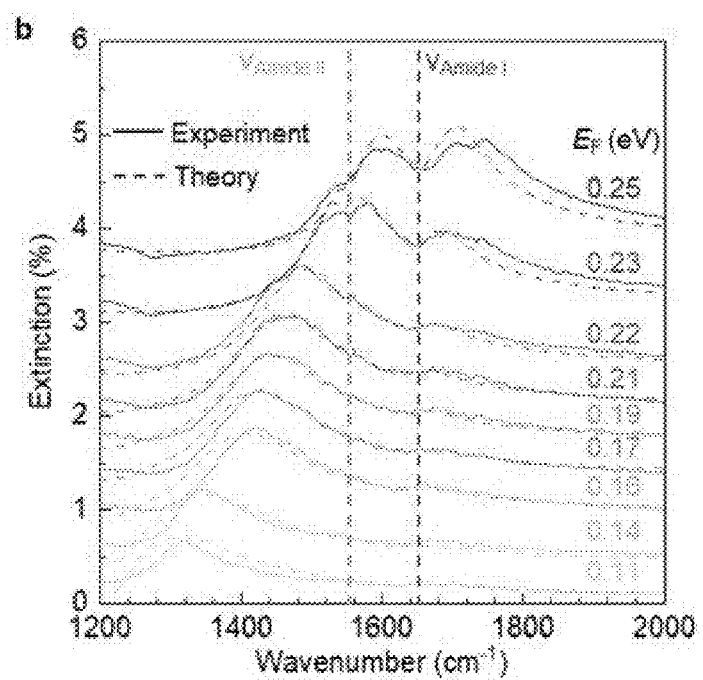

FIG. 12 is an exemplary extinction spectrum (solid line) measured by the graphene plasmon infrared sensor according to Example 1 in an aqueous solution at different gate voltages applied. It can be seen that the characteristic vibration mode of the detected protein can be selectively enhanced at the plasmon resonance absorption peaks, and the dashed line is a simulated calculation of extinction spectrum through a finite element method, which is consistent with the test result.

Figure 13:
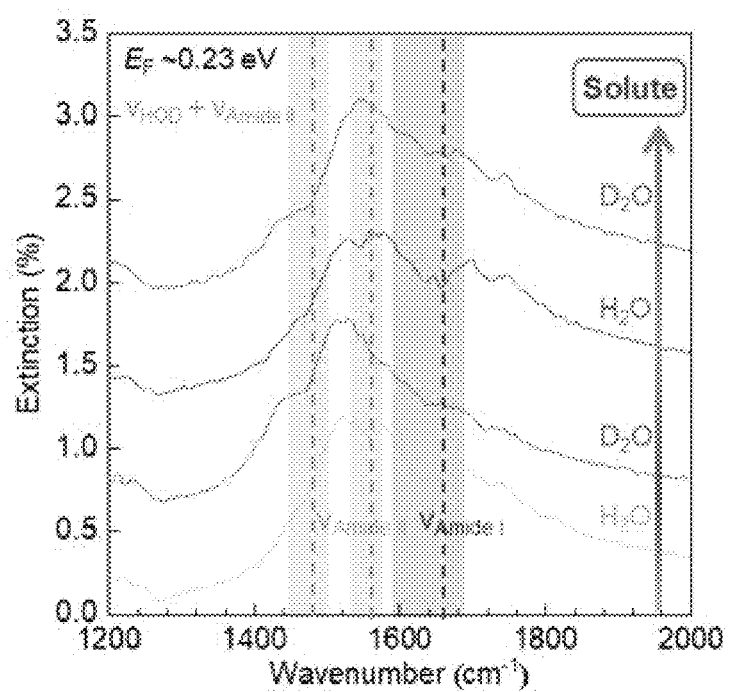

FIG. 13 is an exemplary extinction spectrum measured by the graphene plasmon infrared sensor according to Example 1 in different aqueous protein solutions. It can be seen that the protein vibration mode responds to the change in solution environment in real time under the enhancement of graphene plasmons.

DETAILED DESCRIPTION OF THE EMBODIMENTS

The present invention provides a plasmon enhanced infrared sensor for detecting protein fingerprints in an aqueous solution, including a graphene plasmon infrared sensor and a micro-fluidic system compatible with infrared transmission/reflection measurement;

where the graphene plasmon infrared sensor includes a substrate, a source and a drain, an electrode passivation layer, a graphene layer, a graphene modification layer, a liquid top-gate, a liquid micro-nano cavity and an infrared transparent window;

the micro-fluidic system compatible with infrared transmission/reflection measurement is provided with a sample inlet channel and a sample outlet channel communicated with the graphene plasmon infrared sensor.

In the present invention, the liquid top-gate is conditioned through a reference electrode. In the present invention, the graphene layer is a periodic nanostructure including a plurality of structures with a combined step-shaped longitudinal sectional profile; the liquid micro-nano cavity is arranged above the graphene plasmon infrared sensor through a spacer and an infrared transparent window.

In the present invention, the periodic nanostructure of the graphene layer includes a graphene micro/nanostructure and an etched graphene region; the graphene micro/nanostructure includes any one of a square, an ellipse and a triangle, preferably any one of a square, an ellipse and a triangle, and more preferably an ellipse.

In the present invention, the graphene micro/nanostructure and the etched graphene region independently have a dimension of 5-1000 nm, preferably 10-900 nm, and more preferably 500 nm, in any direction.

In the present invention, the graphene layer surface is covered with a graphene modification layer, and the graphene modification layer and graphene are connected through hydrophobicity, a covalent bond or an ionic bond, and preferably a covalent bond.

In the present invention, the material of the graphene modification layer includes any one of hBN, $MoS_2$, $MoSe_2$, $WS_2$, $WSe_2$, $SiO_2$, $Al_2O_3$, Au, Ag, Cu, Pd, graphene oxide, CuCo alloy, CuPd alloy, benzoic acid, phenylacetic acid, thiol and a macromolecular polymer, and preferably any one of benzoic acid, phenylacetic acid and thiol; the macromolecular polymer includes one or more of polystyrene, polymethylmethacrylate, polyacetic acid, polyethylene, polypropylene, sDNA, DNA, RNA, antibody, antigen, enzyme and thiol, and preferably one or more of polymethylmethacrylate, polyacetic acid, polyethylene and polypropylene.

In the present invention, the electrode passivation layer covers the source and the drain, and the material of the electrode passivation layer is an insulating material including any one of polyethylene, polyether ether ketone, silica gel, resin, ethyl acrylate, asphalt, polyethyl acetate, polyvinyl alcohol, cinnamate, polymethylmethacrylate, polyvinyl alcohol cinnamate and rubber, preferably any one of polyethyl acetate, polyvinyl alcohol, cinnamate, polymethylmethacrylate, polyvinyl alcohol cinnamate and rubber, and more preferably any one of polymethylmethacrylate, polyvinyl alcohol cinnamate and rubber.

In the present invention, the insulating material has a thickness of 0.01-10 μm, preferably 0.1-8 μm, and more preferably 1-5 μm.

In the present invention, the materials of the infrared transparent window and the substrate are independently materials transparent to infrared light with dielectric performance, including one of $SiO_2$, SiN, $Si_3N_4$, $MgF_2$, $Al_2O_3$, $CaF_2$, $BaF_2$, $HfO_2$, $Y_2O_3$, Ge, Si, LiF, AgBr, AgCl, ZnS, ZnSe, KRS-5, AMTIR1-6, diamond, diamond-like carbon and graphene, and preferably one of LiF, AgBr, AgCl, ZnS, ZnSe and KRS-5.

In the present invention, the infrared transparent window has a thickness of 10 nm-10 mm, and preferably 100 nm-8 mm.

In the present invention, the liquid micro-nano cavity is formed by preparing a groove below the infrared transparent window, depositing a patterned thin film on a graphene device to prepare a passivation layer, or placing a spacer between the infrared transparent window and the graphene chip to form a microcavity channel.

In the present invention, the material of the spacer includes one or more of nanosheet, $SiO_2$, SiN, $Si_3N_4$, $MgF_2$, $Al_2O_3$, $CaF_2$, $BaF_2$, $HfO_2$, $Y_2O_3$, Ge, Si, LiF, AgBr, AgCl, ZnS, ZnSe, KRS-5, AMTIR1-6, Au, Pt, Pd, Cu, CuO, Ag, PdO, $PdO_2$, Al, Fe, polytetrafluoroethylene, lead, Mylar, CuCo alloy and CuPd alloy, and preferably one or more of $PdO_2$, Al, Fe, polytetrafluoroethylene and lead.

In the present invention, the material of the patterned thin film deposited on the graphene device includes one or more of Au, Cr, Ti, $MgF_2$, $Al_2O_3$, $SiO_2$, $MgF_2$, $CaF_2$, $BaF_2$, $HfO_2$, $Y_2O_3$, LiF, AgBr, AgCl, ZnS and ZnSe, and preferably one or more of LiF, AgBr, AgCl, ZnS and ZnSe.

In the present invention, the patterned thin film has a thickness of 0.001-5 μm, preferably 0.01-4 μm, and more preferably 0.1-3 μm.

In the present invention, the micro-fluidic system compatible with infrared transmission/reflection measurement includes a transmission infrared liquid flow cell, where the material of the transmission infrared liquid flow cell includes any one of polytetrafluoroethylene, polyether ether ketone, glass, polycarbonate, polymethylmethacrylate, fluororubber and Teflon, and preferably any one of polycarbonate, polymethylmethacrylate and fluororubber.

The present invention provides a method for preparing the plasmon enhanced infrared sensor for detecting the protein fingerprints in the aqueous solution, including:
  depositing a source and a drain to a substrate, transferring a graphene layer, and preparing a graphene micro-nano structure and a graphene modification layer on the graphene layer;
  preparing an electrode passivation layer and a liquid micro-nano cavity;
  and preparing an infrared transparent window, and sealing the graphene plasmon infrared sensor, the liquid micro-nano cavity and a transmission infrared liquid flow cell by using O rings to obtain the sensor.

In the present invention, the Fermi level of the graphene layer is modulated to 0 using a liquid top-gate as the background signal.

In the present invention, the doping concentration (n-type or p-type) of the graphene layer is modulated so as to modulate the sensing frequency band of the sensor and conduct the infrared spectroscopy enhancement performance test in aqueous solutions.

The technical solutions provided by the present invention will be described in detail below with reference to the examples, which, however, should not be construed as limiting the protection scope of the present invention.

Example 1

Figure 1:
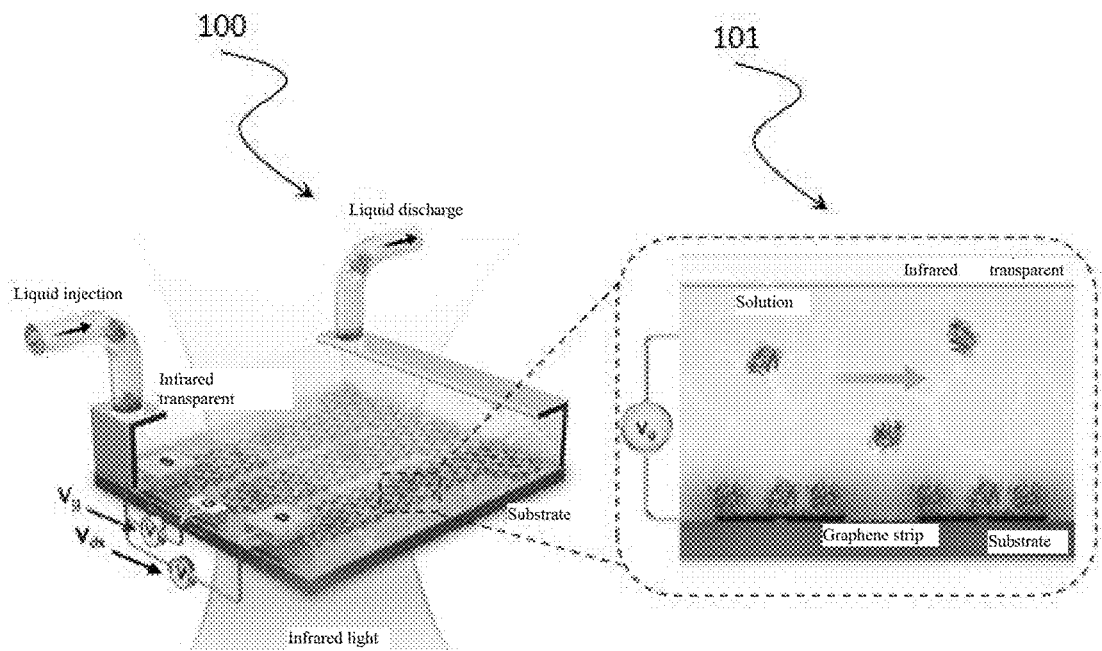
FIG. 1 illustrates the working principle of the plasmon enhanced infrared sensor according to Example 1 of the present invention, where 100 is a schematic diagram of the working principle, and a graphene plasmon infrared chip is encapsulated in a micro-fluidic system compatible with infrared transmission/reflection measurement filled with a solution; 101 is an enlarged schematic view of the graphene plasmon region; when the surface of graphene is enriched with molecules to be detected, water molecules are excluded from the plasmon region (red), and the Fermi level of the graphene is modulated by the gate voltage, such that the background signals of water outside the graphene plasmon hotspot region is eliminated in situ, and the infrared signals of the molecules to be detected, which are enriched on the surface, is amplified.
Figure 2:
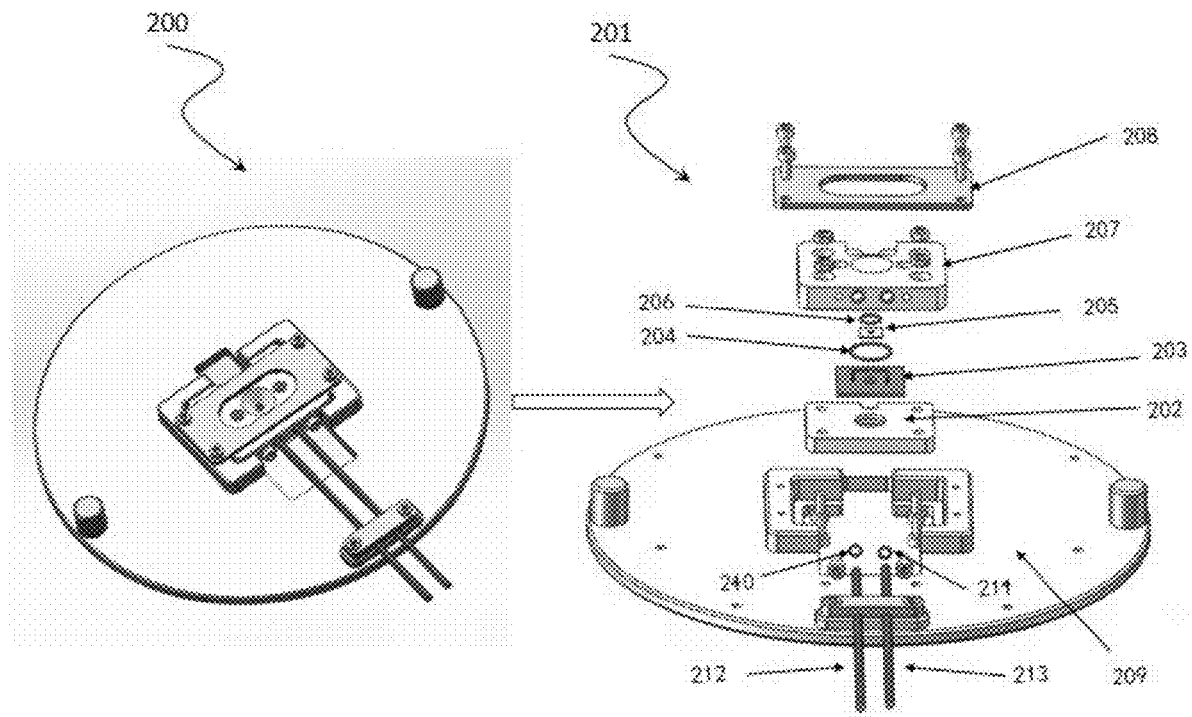
FIG. 2 is an exploded view of the plasmon enhanced infrared sensor according to Example 1 of the present invention, where 200 is a side view of a transmission graphene plasmon enhanced infrared sensor for aqueous solutions; 201 is an exploded view of the transmission graphene plasmon enhanced infrared sensor for aqueous solutions; 202 is a substrate of a micro-fluidic system; 203 is a graphene plasmon infrared sensor for aqueous solutions; 204 is a substrate sealing O ring; 205 is an infrared transparent window; 206 is an infrared transparent window sealing O ring; 207 is a cover plate of the micro-fluidic system; 208 is a fixing device; 209 is an infrared sample platform; 210 is a sample inlet sealing O ring; 211 is a sample outlet sealing O ring; 212 is a sample inlet channel; 213 is a sample outlet channel.
Figure 3:
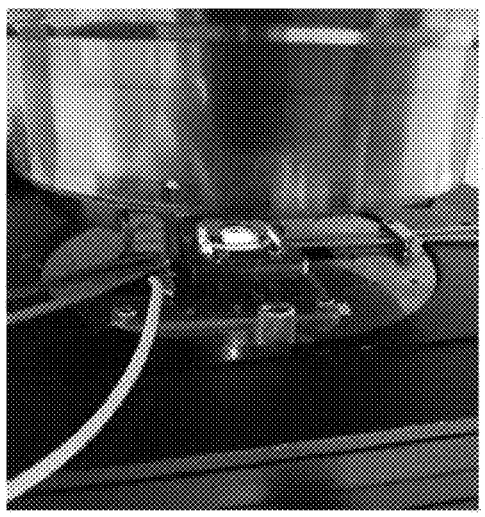
FIG. 3 is a diagram illustrating an exemplary infrared spectroscopy test of the plasmon enhanced infrared sensor according to Example 1 of the present invention.
Figure 4:
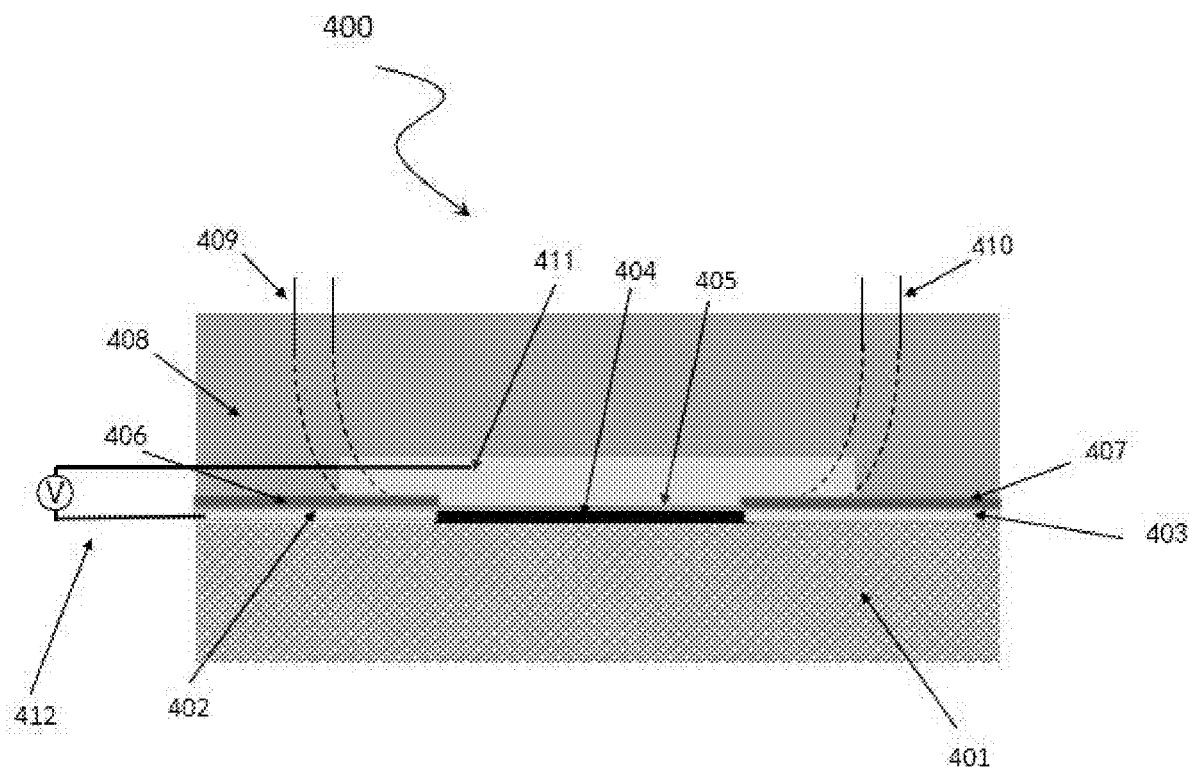
FIG. 4 is a schematic structural diagram of the plasmon enhanced infrared sensor according to Example 1 of the present invention, where 400 is a graphene plasmon infrared sensor for aqueous solutions; 401 is a substrate; 402 and 403 are electrodes; 404 is graphene; 405 is a graphene modification layer; 406 and 407 are electrode passivation layers; 408 is an infrared transparent window forming a micro-nano cavity channel; 409 is a sample inlet channel; 410 is a sample outlet channel; 411 is a liquid top-gate; 412 is a voltage source for gate.

As shown in FIG. 4, Example 1 is a first plasmon enhanced infrared sensor of the present invention including a substrate 401, electrodes 402 and 403, graphene 404, a graphene modification layer 405, electrode passivation layers 406 and 407, an infrared transparent window 408 forming a micro-nano cavity channel, a sample inlet channel 409, a sample outlet channel 410, a liquid top-gate 411 and a voltage source for gate 412.

408, 409, and 410 together form the pathway for liquid flow; the solution to be detected flows in from one end of the sample inlet and flows out from one end of the sample outlet. The sensor of the present invention can be used to enhance the infrared absorption signals of biological or chemical molecules in a solution and monitor their changes.

Figure 7:
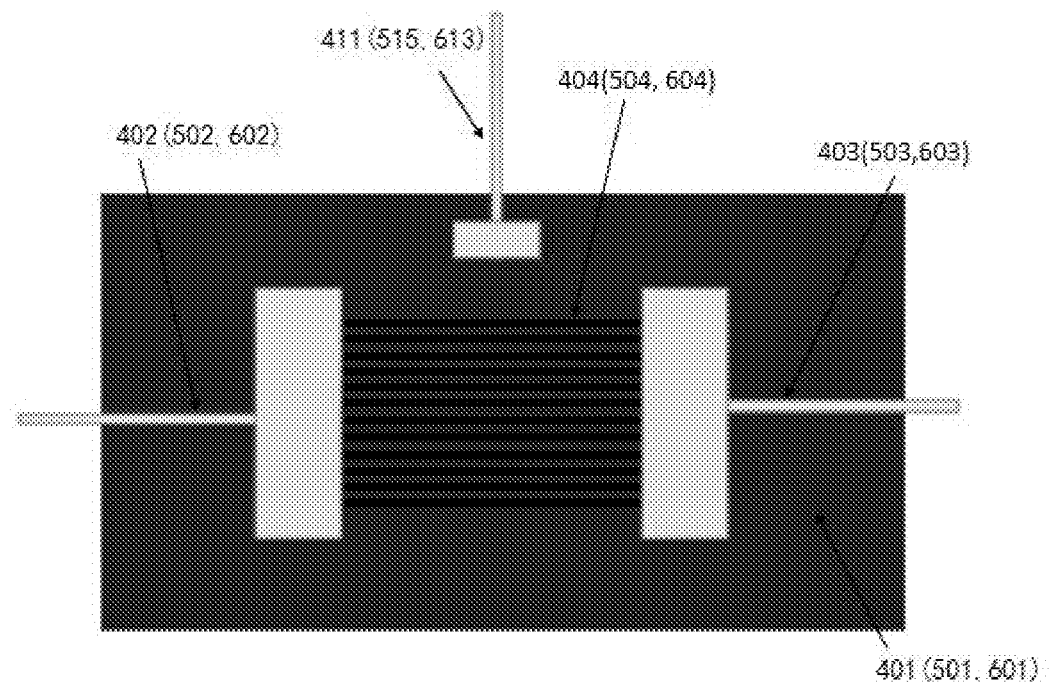
FIG. 7 is a schematic diagram of the graphene plasmon device according to Example 1; 401 (501, 601) is substrate; 402 (502, 602) and 403 (503, 603) are source and drain, respectively; 404 (504, 604) is graphene micro-nano structure; 411 (515, 613) is graphene micro-nano structure.
Figure 8:
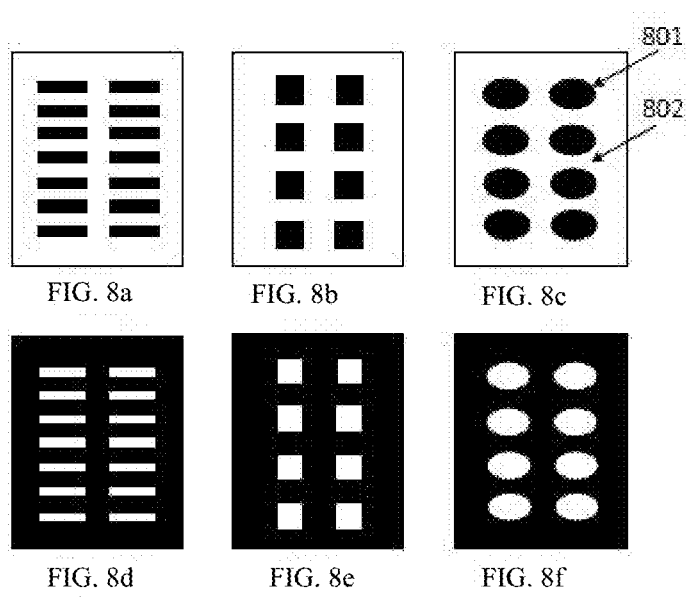
FIGS. 8A-8F show schematic diagrams of the graphene micro-nano structure according to Example 1; 801 (black) is graphene micro/nanostructure; 802 (white) is etched graphene region; where
Figure 9:
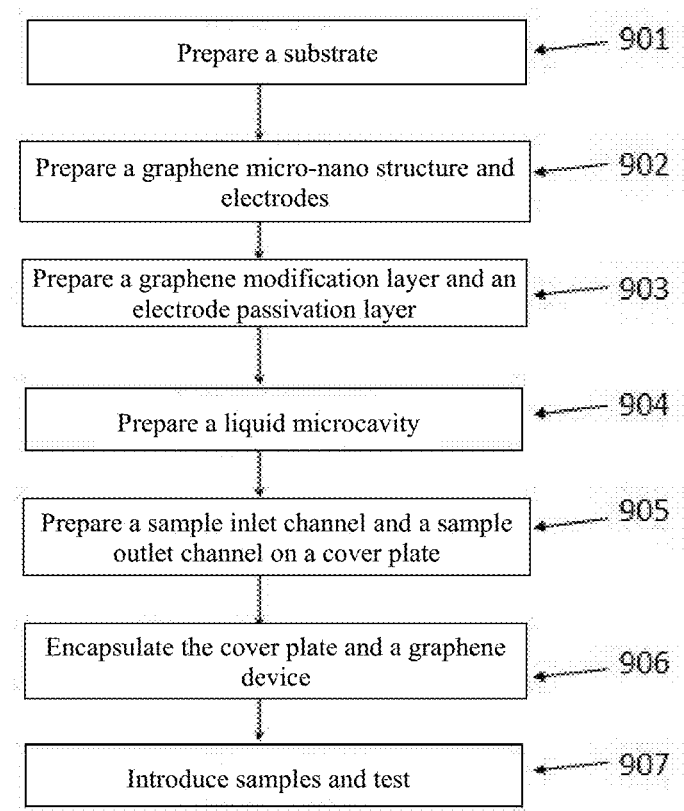
FIG. 9 is a flow chart of the method for preparing the graphene plasmon infrared sensor according to the present invention.

As shown in FIG. 7, the graphene micro-nano structure is connected with electrodes. The graphene layer 404 includes a single layer, two layers, or more than two layers of graphene, which cover the substrate 401, and contact the upper surfaces of the source 402 and the drain 403 to form a conductive channel between the source and the drain metal layers. Preferably, a single layer of graphene is used in specific examples of the present invention.

As shown in FIGS. 8A-8F, the graphene micro-nano structure may be a periodic rectangle, a square or an ellipse structure and an inverse structure thereof, with dimensions in a range of 10-1000 nm. Taking FIG. 8D as an example, rectangular through holes 802 are etched on the graphene layer, and mesh graphene strip structures 801 remain. When infrared light irradiates these structures, localized plasmons can be excited, and localized electromagnetic field enhancement can be generated on the microstructure. Preferably, a graphene nano strip structure 8 is used in specific examples of the present invention.

The method for preparing the first plasmon enhanced infrared sensor includes:
  Step 901: selecting a supporting substrate made of an infrared-transparent and firm material with a smooth surface, and preparing a dielectric layer on the substrate;
  Step 902: preparing a graphene micro-nano structure and electrodes on the supporting substrate;
  Step 903: preparing a graphene modification layer and an electrode passivation layer on surfaces of the graphene micro-nano structure and the electrodes;
  Step 904: preparing a liquid microcavity on a surface of a graphene plasmon device;
  Step 905: preparing a cover plate with a sample inlet channel and a sample outlet channel;
  Step 906: encapsulating the cover plate and the graphene device to obtain the graphene plasmon infrared sensor working on an aqueous solution; and
  Step 907: testing the liquid flow performance and the infrared spectroscopy enhancement performance of the device.

Example 2

Figure 5:
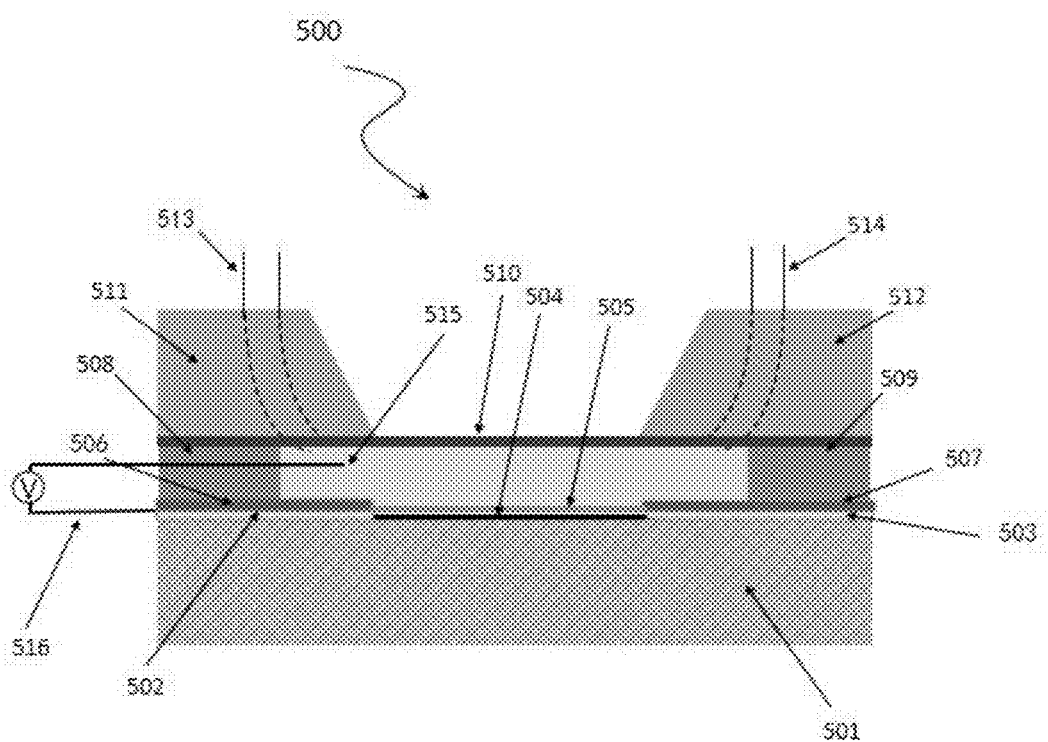
FIG. 5 is a schematic structural diagram of the structure of the plasmon enhanced infrared sensor according to Example 2 of the present invention;
  where 500 is a graphene plasmon infrared sensor for aqueous solutions; 501 is a substrate; 502 and 503 are electrodes; 504 is graphene; 505 is a graphene modification layer; 506 and 507 are electrode passivation layers; 508 and 509 are spacers for controlling the height of a microcavity channel; 510 is an infrared transparent window; 511 and 512 are cover plates; 513 is a sample inlet channel; 514 is a sample outlet channel; 515 is a liquid top-gate; 516 is a voltage source for gate.

As shown in FIG. 5, Example 2 is a second plasmon enhanced infrared sensor of the present invention, where 500 is a graphene plasmon infrared sensor for aqueous solutions; 501 is a substrate; 502 and 503 are electrodes; 504 is graphene; 505 is a graphene modification layer; 506 and 507 are electrode passivation layers; 508 and 509 are spacers for controlling the height of a microcavity channel; 510 is an infrared transparent window; 511 and 512 are cover plates; 513 is a sample inlet channel; 514 is a sample outlet channel; 515 is a liquid top-gate; 516 is a voltage source for gate.

The method for preparing the second plasmon enhanced infrared sensor is the same as Example 1.

Example 3

Figure 6:
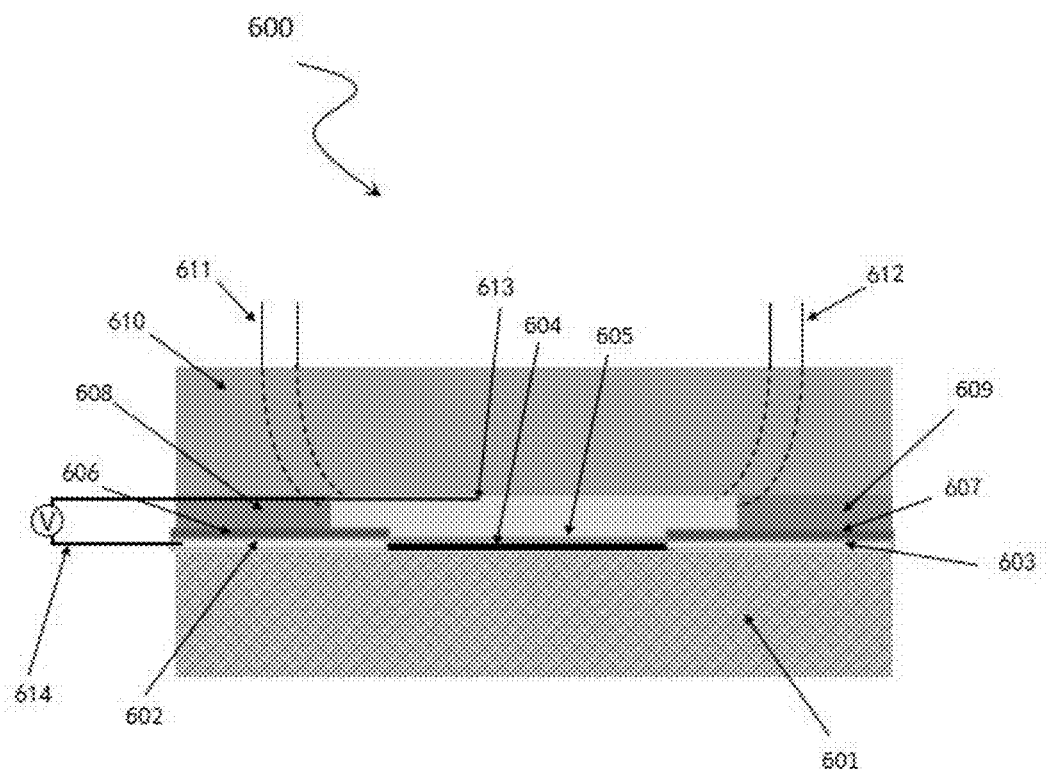
FIG. 6 is a schematic structural diagram of the plasmon enhanced infrared sensor according to Example 3 of the present invention;
  where 600 is a graphene plasmon infrared sensor in an aqueous solution; 601 is a substrate; 602 and 603 are electrodes; 604 is graphene; 605 is a graphene modification layer; 606 and 607 are electrode passivation layers; 608 and 609 are spacers for controlling the height of the microcavity channel; 610 is an infrared transparent window; 611 is a sample inlet channel; 612 is a sample outlet channel; 613 is a liquid top-gate; 614 is a voltage source for gate.

As shown in FIG. 6, Example 3 is a third plasmon enhanced infrared sensor of the present invention, where 600 is a graphene plasmon infrared sensor in an aqueous solution; 601 is a substrate; 602 and 603 are electrodes; 604 is graphene; 605 is a graphene modification layer; 606 and 607 are electrode passivation layers; 608 and 609 are spacers for controlling the height of the microcavity channel; 610 is an infrared transparent window; 611 is a sample inlet channel; 612 is a sample outlet channel; 613 is a liquid top-gate; 614 is a voltage source for gate.

The method for preparing the third plasmon enhanced infrared sensor is the same as Example 1.

The plasmon enhanced infrared sensor obtained in Example 1 was subjected to a performance test to obtain FIGS. 10-13:

FIG. 10 illustrates an exemplary infrared absorption spectrum of an aqueous protein solution measured without plasmon enhancement and an exemplary extinction spectrum measured with plasmon enhancement after a protein solution is introduced into the graphene plasmon infrared sensor according to Example 1, and the characteristic vibration modes of proteins at the amide I band and the amide II band can be identified.

FIG. 11 illustrates the transfer characteristic curve of the graphene plasmon infrared sensor according to Example 1 in an aqueous solution and the Fermi energy of graphene corresponding to gate voltage applied to the graphene layer.

FIG. 12 is an exemplary extinction spectrum (solid line) measured by the graphene plasmon infrared sensor according to Example 1 in an aqueous solution at different gate voltages applied. It can be seen that the characteristic vibration mode of the detected protein can be selectively enhanced at the plasmon resonance absorption peaks, and the dashed line is a simulated calculation of extinction spectrum through a finite element method, which is consistent with the test result.

FIG. 13 is an exemplary extinction spectrum measured by the graphene plasmon infrared sensor according to Example 1 in different aqueous solution environments. It can be seen that the plasmon resonance absorption peak responds to the change in the solution environment in real time.

According to the above examples, the present invention provides a plasmon enhanced infrared sensor for detecting protein fingerprints in an aqueous solution through the integration of a micro-fluidic system compatible with infrared transmission/reflection measurement and a graphene plasmon infrared sensor. Firstly, the height of the micro-nano cavity is less than 10 micrometers to ensure that infrared light can still effectively transmit when the micro-nano cavity is filled with an aqueous solution. Then, by using the local ultra high field and dynamic adjustability of graphene plasmons, the Fermi level of the graphene is electrically adjusted to a Dirac point to acquire the background by utilizing an electricity method, and the graphene plasmons are adjusted to an n-type or p-type doping to acquire the spectra, such that the background signals of water outside the plasmon region (about 15 nm) are directly eliminated in situ in a conventional infrared spectroscopy measurement, and finally, the plasmon enhanced infrared spectrum of the liquid sample is obtained.

The above descriptions are only preferred embodiments of the present invention. It should be noted that those of ordinary skill in the art can also make several improvements and modifications without departing from the principle of the present invention, and such improvements and modifications shall fall within the protection scope of the present invention.

What is claimed is:

1. A plasmon enhanced infrared sensor for detecting protein fingerprints in an aqueous solution, comprising a graphene plasmon infrared sensor and a micro-fluidic system compatible with an infrared transmission/reflection measurement;

wherein the graphene plasmon infrared sensor comprises a substrate, a source and a drain, an electrode passivation layer, a graphene layer, a graphene modification layer, a liquid top-gate, a liquid micro-nano cavity and an infrared transparent window;

the micro-fluidic system is provided with a sample inlet channel and a sample outlet channel, wherein the sample inlet channel and the sample outlet channel are communicated with the graphene plasmon infrared sensor.

2. The plasmon enhanced infrared sensor according to claim 1, wherein the liquid top-gate is conditioned through a reference electrode;

the graphene layer is a periodic nanostructure comprising a plurality of structures with a combined step-shaped longitudinal sectional profile; the liquid micro-nano cavity is arranged above the graphene plasmon infrared sensor through a spacer and an infrared transparent window.

3. The plasmon enhanced infrared sensor according to claim 2, wherein the periodic nanostructure of the graphene layer comprises a graphene micro/nanostructure and an etched graphene region; the graphene micro/nanostructure comprises any one selected from the group consisting of a square, an ellipse and a triangle.

4. The plasmon enhanced infrared sensor according to claim 3, wherein the graphene micro/nanostructure and the etched graphene region independently have a dimension of 5-1000 nm in any direction.

5. The plasmon enhanced infrared sensor according to claim 4, wherein materials of the infrared transparent window and the substrate are independently materials transparent to infrared light with dielectric performance, comprising one selected from the group consisting of $SiO_2$, SiN, $Si_3N_4$, $MgF_2$, $Al_2O_3$, $CaF_2$, $BaF_2$, $HfO_2$, $Y_2O_3$, Ge, Si, LiF, AgBr, AgCl, ZnS, ZnSe, KRS-5, AMTIR1-6, diamond, diamond-like carbon and graphene; the infrared transparent window has a thickness of 10 nm-10 mm.

6. The plasmon enhanced infrared sensor according to claim 5, wherein the liquid micro-nano cavity is formed by preparing a groove below the infrared transparent window, depositing a patterned thin film on a graphene device to prepare a passivation layer, or placing a spacer between the infrared transparent window and a graphene chip to form a microcavity channel.

7. The plasmon enhanced infrared sensor according to claim 6, wherein a material of the spacer comprises at least one selected from the group consisting of nanosheet, $SiO_2$, SiN, $Si_3N_4$, $MgF_2$, $Al_2O_3$, $CaF_2$, $BaF_2$, $HfO_2$, $Y_2O_3$, Ge, Si, LiF, AgBr, AgCl, ZnS, ZnSe, KRS-5, AMTIR1-6, Au, Pt, Pd, Cu, CuO, Ag, PdO, $PdO_2$, Al, Fe, polytetrafluoroethylene, lead, Mylar, CuCo alloy and CuPd alloy; a material of the patterned thin film deposited on the graphene device comprises at least one selected from the group consisting of Au, Cr, Ti, $MgF_2$, $Al_2O_3$, $SiO_2$, $MgF_2$, $CaF_2$, $BaF_2$, $HfO_2$, $Y_2O_3$, LiF, AgBr, AgCl, ZnS and ZnSe; the patterned thin film has a thickness of 0.001-5 μm.

8. The plasmon enhanced infrared sensor according to claim 4, wherein a graphene layer surface is covered with a graphene modification layer, and the graphene modification layer and graphene are connected through hydrophobicity, a covalent bond or an ionic bond;

a material of the graphene modification layer comprises any one selected from the group consisting of hBN, $MoS_2$, $MoSe_2$, $WS_2$, $WSe_2$, $SiO_2$, $Al_2O_3$, Au, Ag, Cu, Pd, graphene oxide, CuCo alloy, CuPd alloy, benzoic acid, phenylacetic acid, thiol and a macromolecular polymer; the macromolecular polymer comprises at least one selected from the group consisting of polystyrene, polymethylmethacrylate, polyacetic acid, polyethylene, polypropylene, sDNA, DNA, RNA, antibody, antigen, enzyme and thiol.

9. The plasmon enhanced infrared sensor according to claim 3, wherein a graphene layer surface is covered with a graphene modification layer, and the graphene modification layer and graphene are connected through hydrophobicity, a covalent bond or an ionic bond;
a material of the graphene modification layer comprises any one selected from the group consisting of hBN, $MoS_2$, $MoSe_2$, $WS_2$, $WSe_2$, $SiO_2$, $Al_2O_3$, Au, Ag, Cu, Pd, graphene oxide, CuCo alloy, CuPd alloy, benzoic acid, phenylacetic acid, thiol and a macromolecular polymer; the macromolecular polymer comprises at least one selected from the group consisting of polystyrene, polymethylmethacrylate, polyacetic acid, polyethylene, polypropylene, sDNA, DNA, RNA, antibody, antigen, enzyme and thiol.

10. The plasmon enhanced infrared sensor according to claim 2, wherein a material of the spacer comprises at least one selected from the group consisting of nanosheet, $SiO_2$, SiN, $Si_3N_4$, $MgF_2$, $Al_2O_3$, $CaF_2$, $BaF_2$, $HfO_2$, $Y_2O_3$, Ge, Si, LiF, AgBr, AgCl, ZnS, ZnSe, KRS-5, AMTIR1-6, Au, Pt, Pd, Cu, CuO, Ag, PdO, $PdO_2$, Al, Fe, polytetrafluoroethylene, lead, Mylar, CuCo alloy and CuPd alloy; a material of a patterned thin film deposited on a graphene device comprises at least one selected from the group consisting of Au, Cr, Ti, $MgF_2$, $Al_2O_3$, $SiO_2$, $MgF_2$, $CaF_2$, $BaF_2$, $HfO_2$, $Y_2O_3$, LiF, AgBr, AgCl, ZnS and ZnSe; the patterned thin film has a thickness of 0.001-5 μm.

11. The plasmon enhanced infrared sensor according to claim 2, wherein a graphene layer surface is covered with a graphene modification layer, and the graphene modification layer and graphene are connected through hydrophobicity, a covalent bond or an ionic bond;
a material of the graphene modification layer comprises any one selected from the group consisting of hBN, $MoS_2$, $MoSe_2$, $WS_2$, $WSe_2$, $SiO_2$, $Al_2O_3$, Au, Ag, Cu, Pd, graphene oxide, CuCo alloy, CuPd alloy, benzoic acid, phenylacetic acid, thiol and a macromolecular polymer; the macromolecular polymer comprises at least one selected from the group consisting of polystyrene, polymethylmethacrylate, polyacetic acid, polyethylene, polypropylene, sDNA, DNA, RNA, antibody, antigen, enzyme and thiol.

12. The plasmon enhanced infrared sensor according to claim 1, wherein a graphene layer surface is covered with a graphene modification layer, and the graphene modification layer and graphene are connected through hydrophobicity, a covalent bond or an ionic bond;
a material of the graphene modification layer comprises any one selected from the group consisting of hBN, $MoS_2$, $MoSe_2$, $WS_2$, $WSe_2$, $SiO_2$, $Al_2O_3$, Au, Ag, Cu, Pd, graphene oxide, CuCo alloy, CuPd alloy, benzoic acid, phenylacetic acid, thiol and a macromolecular polymer; the macromolecular polymer comprises at least one selected from the group consisting of polystyrene, polymethylmethacrylate, polyacetic acid, polyethylene, polypropylene, sDNA, DNA, RNA, antibody, antigen, enzyme and thiol.

13. The plasmon enhanced infrared sensor according to claim 12, wherein the electrode passivation layer covers the source and the drain, and a material of the electrode passivation layer is an insulating material comprising any one selected from the group consisting of polyethylene, polyether ether ketone, silica gel, resin, ethyl acrylate, asphalt, polyethyl acetate, polyvinyl alcohol, cinnamate, polymethylmethacrylate, polyvinyl alcohol cinnamate and rubber, and the insulating material has a thickness of 0.01-10 μm.

14. The plasmon enhanced infrared sensor according to claim 13, wherein materials of the infrared transparent window and the substrate are independently materials transparent to infrared light with dielectric performance, comprising one selected from the group consisting of $SiO_2$, SiN, $Si_3N_4$, $MgF_2$, $Al_2O_3$, $CaF_2$, $BaF_2$, $HfO_2$, $Y_2O_3$, Ge, Si, LiF, AgBr, AgCl, ZnS, ZnSe, KRS-5, AMTIR1-6, diamond, diamond-like carbon and graphene; the infrared transparent window has a thickness of 10 nm-10 mm.

15. A method for preparing the plasmon enhanced infrared sensor according to claim 1, comprising:
selecting a supporting substrate made of an infrared-transparent and firm material with a smooth surface, and preparing a dielectric layer on the substrate;
preparing a graphene micro-nano structure and electrodes on the supporting substrate;
preparing the graphene modification layer and the electrode passivation layer on surfaces of the graphene micro-nano structure and the electrodes;
preparing a liquid microcavity on a surface of a graphene plasmon device;
preparing a cover plate with the sample inlet channel and the sample outlet channel;
encapsulating the cover plate and a graphene device to obtain the graphene plasmon infrared sensor working on the aqueous solution;
and testing a liquid flow performance and an infrared spectroscopy enhancement performance of the plasmon enhanced infrared sensor.

16. The method according to claim 15, wherein in the plasmon enhanced infrared sensor, the liquid top-gate is conditioned through a reference electrode;
the graphene layer is a periodic nanostructure comprising a plurality of structures with a combined step-shaped longitudinal sectional profile; the liquid micro-nano cavity is arranged above the graphene plasmon infrared sensor through a spacer and an infrared transparent window.

17. The method according to claim 16, wherein in the plasmon enhanced infrared sensor, the periodic nanostructure of the graphene layer comprises a graphene micro/nanostructure and an etched graphene region; the graphene micro/nanostructure comprises any one selected from the group consisting of a square, an ellipse and a triangle.

18. The method according to claim 17, wherein in the plasmon enhanced infrared sensor, the graphene micro/nanostructure and the etched graphene region independently have a dimension of 5-1000 nm in any direction.

19. The method according to claim 15, wherein in the plasmon enhanced infrared sensor, a graphene layer surface is covered with a graphene modification layer, and the graphene modification layer and graphene are connected through hydrophobicity, a covalent bond or an ionic bond;
a material of the graphene modification layer comprises any one selected from the group consisting of hBN, $MoS_2$, $MoSe_2$, $WS_2$, $WSe_2$, $SiO_2$, $Al_2O_3$, Au, Ag, Cu, Pd, graphene oxide, CuCo alloy, CuPd alloy, benzoic acid, phenylacetic acid, thiol and a macromolecular polymer; the macromolecular polymer comprises at least one selected from the group consisting of polystyrene, polymethylmethacrylate, polyacetic acid, polyethylene, polypropylene, sDNA, DNA, antibody, antigen, enzyme and thiol.

20. The method according to claim 19, wherein in the plasmon enhanced infrared sensor, the electrode passivation layer covers the source and the drain, and a material of the electrode passivation layer is an insulating material comprising any one selected from the group consisting of polyethylene, polyether ether ketone, silica gel, resin, ethyl acrylate, asphalt, polyethyl acetate, polyvinyl alcohol, cinnamate, polymethylmethacrylate, polyvinyl alcohol cinnamate and rubber, and the insulating material has a thickness of 0.01-10 μm.

* * * * *